Nov. 6, 1923.
E. C. AVERY
SAW RIG
Filed July 2, 1921
1,473,536
4 Sheets-Sheet 1
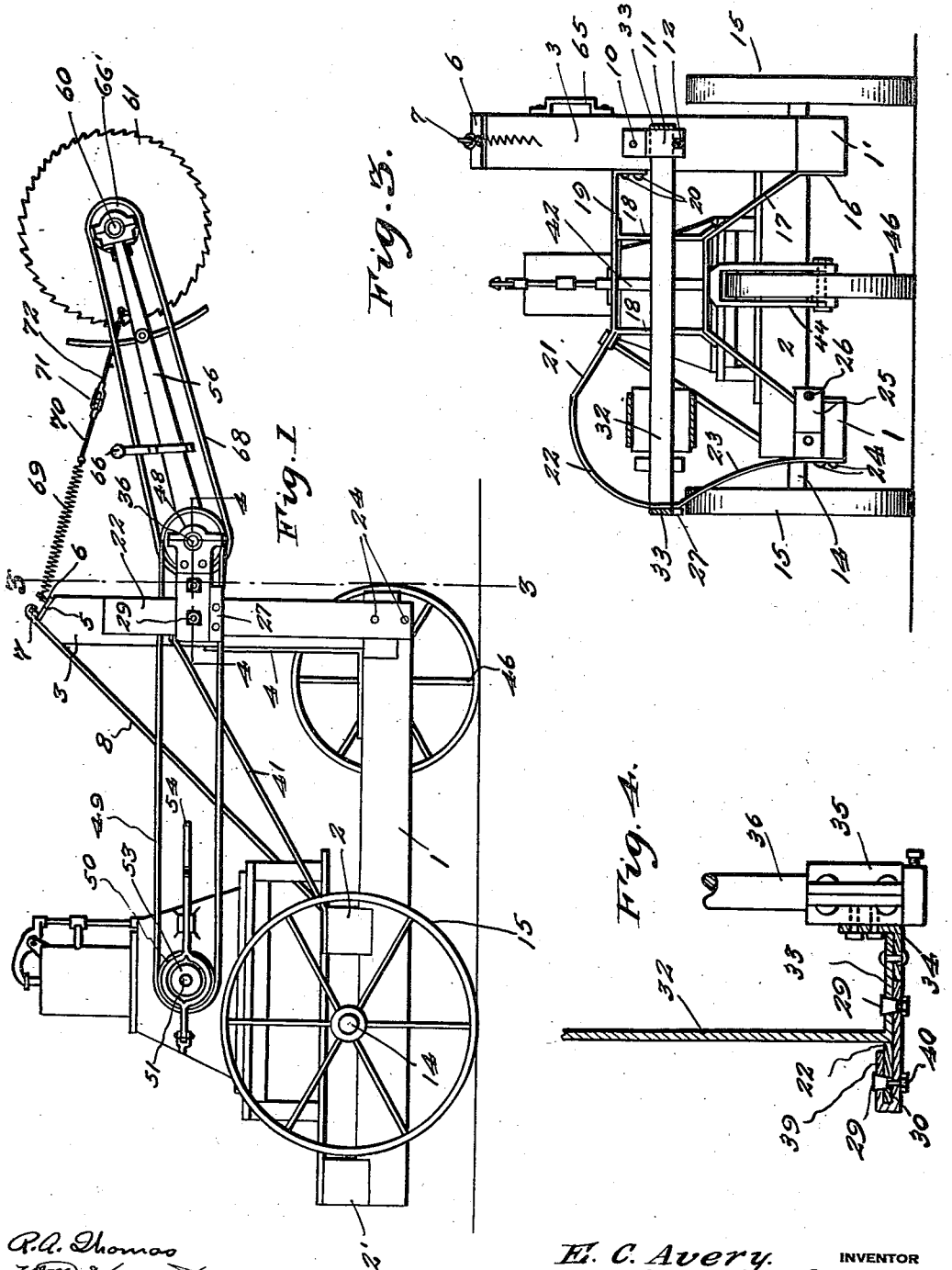
INVENTOR
E. C. Avery.
BY Victor J. Evans
ATTORNEY
WITNESSES Nov. 6, 1923.  
E. C. AVERY  
SAW RIG  
Filed July 2, 1921
1,473,536
4 Sheets-Sheet 2
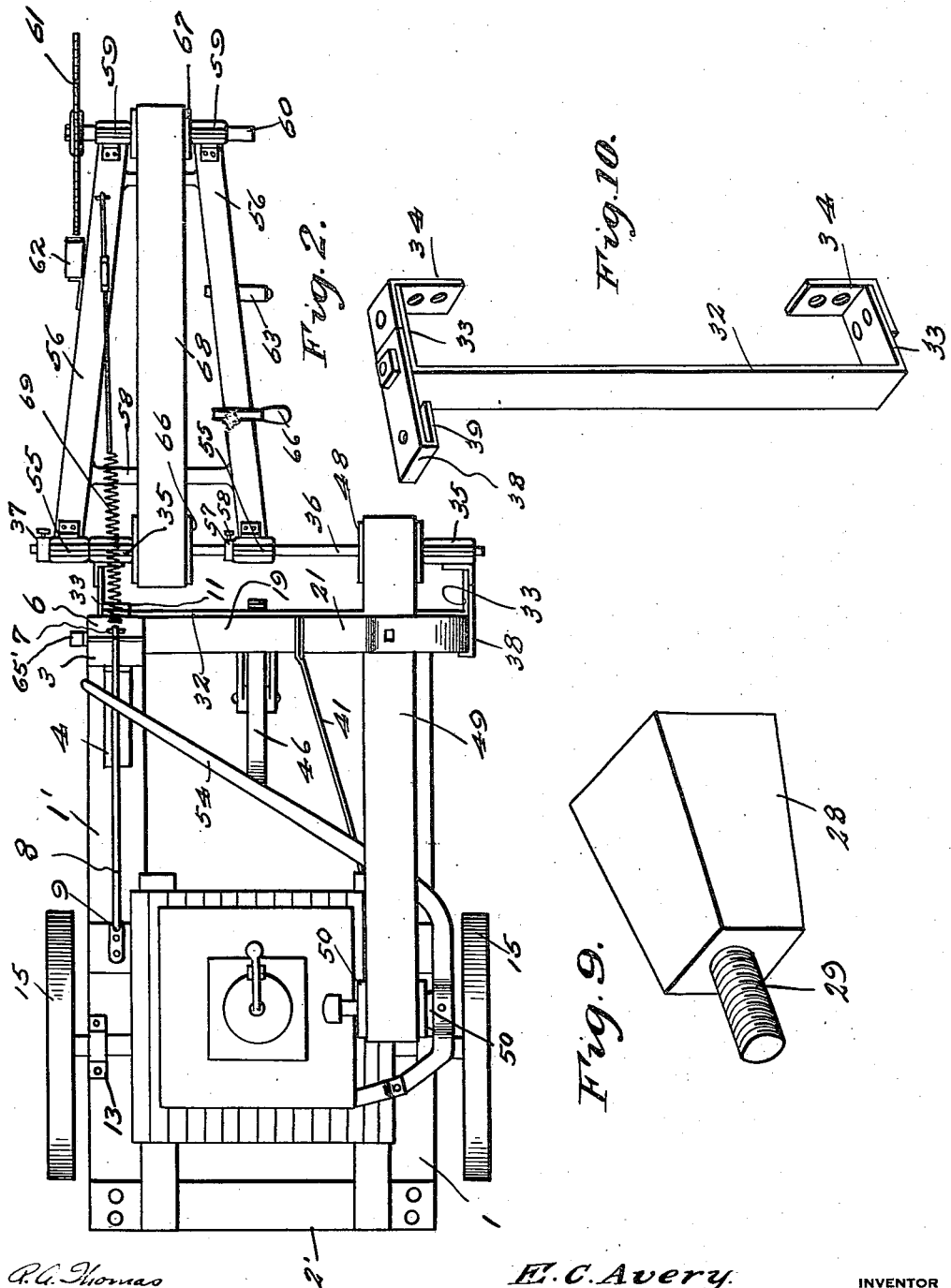
E. C. Avery, INVENTOR
BY Victor J. Evans, ATTORNEY
WITNESSES Nov. 6, 1923.
E. C. AVERY
SAW RIG
Filed July 2, 1921
1,473,536
4 Sheets-Sheet 3
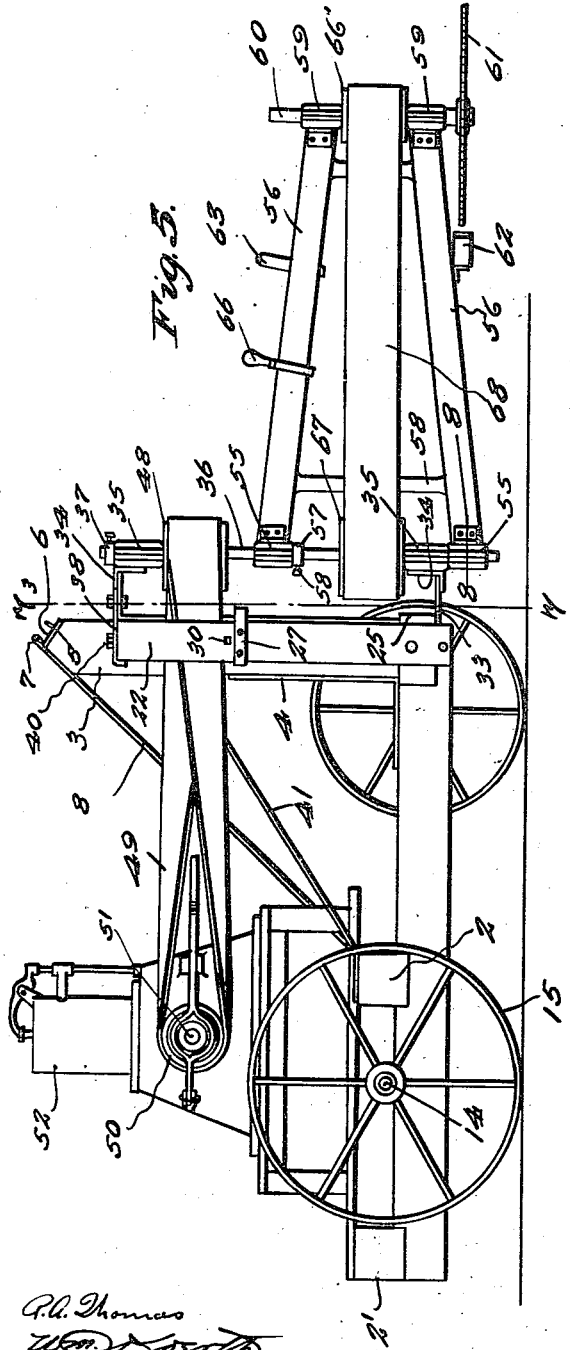
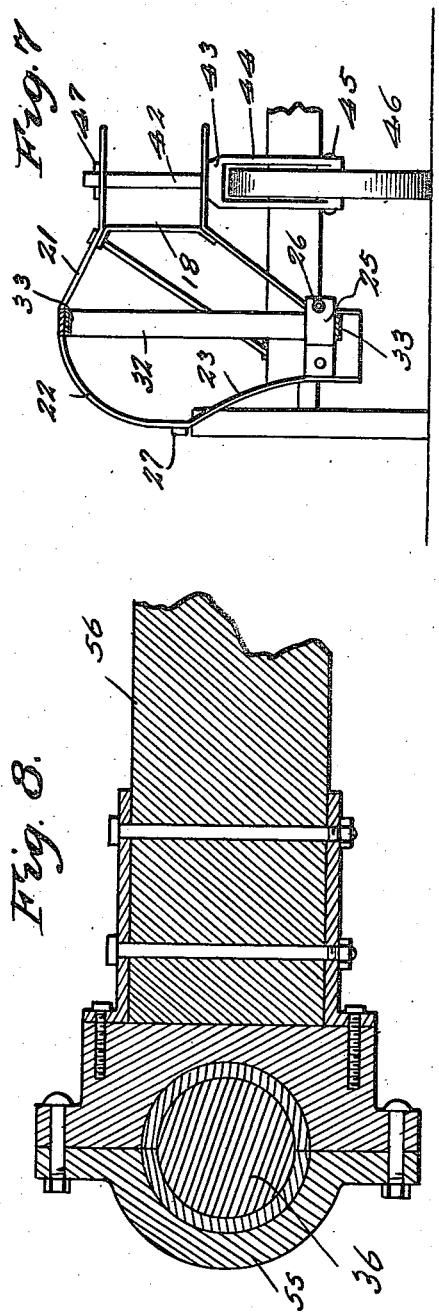

Nov. 6, 1923.
E. C. AVERY
1,473,536
SAW RIG
Filed July 2, 1921
4 Sheets-Sheet 4
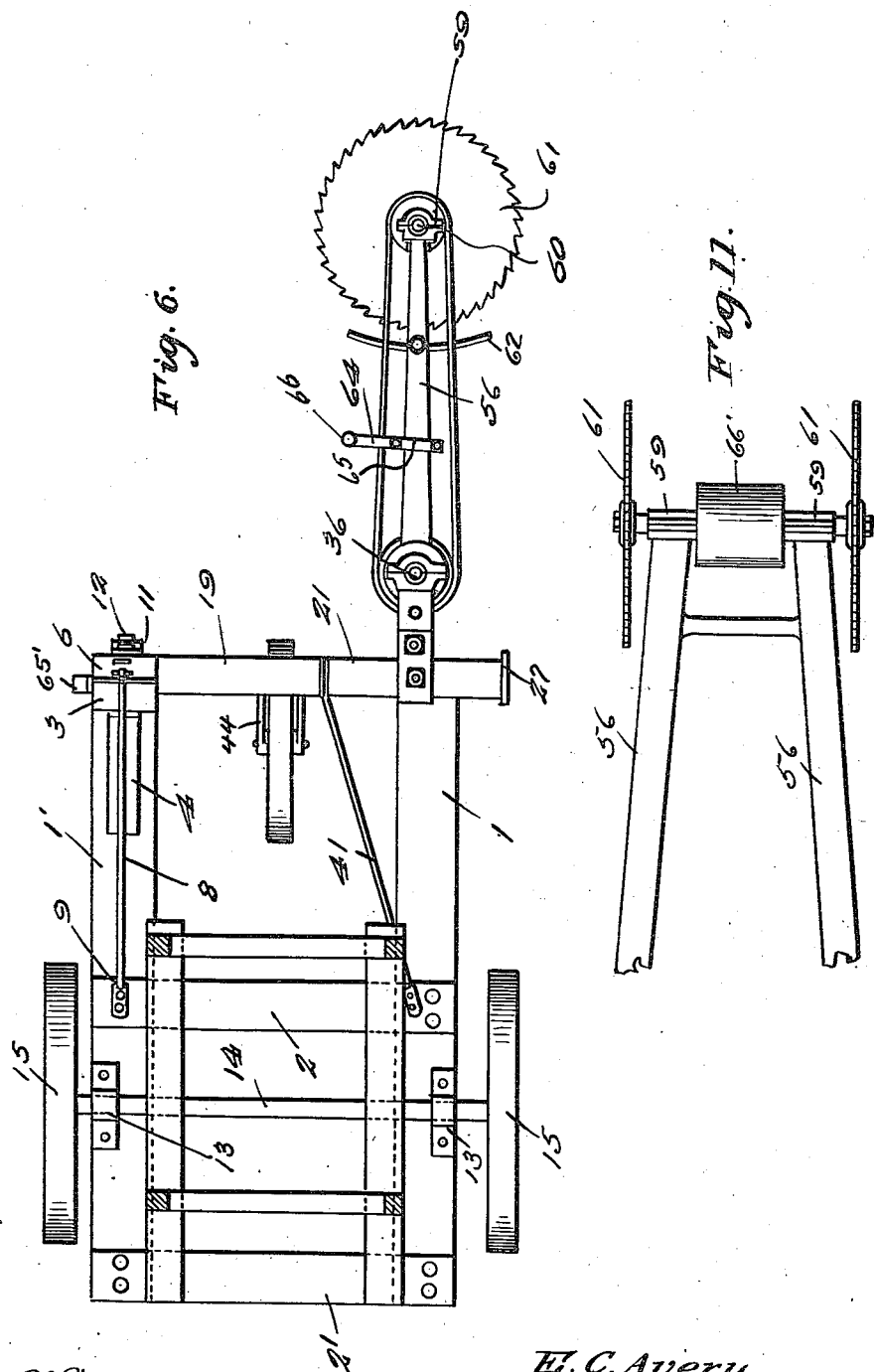

Patented Nov. 6, 1923.

1,473,536

UNITED STATES PATENT OFFICE.

EMMETT C. AVERY, OF HUTCHINSON, KANSAS.

SAW RIG.

Application filed July 2, 1921. Serial No. 482,101.

*To all whom it may concern:*

Be it known that I, EMMETT C. AVERY, a citizen of the United States, residing at Hutchinson, in the county of Reno and State of Kansas, have invented new and useful Improvements in Saw Rigs, of which the following is a specification.

My present invention has reference to what I will term a saw rig.

My object is to produce a device of this character which may be wheeled by the operator for shifting the same into cutting position, and whereby a single operator may arrange the device for cutting either vertically or horizontally and at different angles, should the work require angular cuts.

A further object is to mount on a wheeled truck, in a novel manner, a motor driven circular saw in which the saw may be shifted to either a vertical or horizontal position, and at varying angles between such positions, and fed to its work in an easy, accurate and expeditious manner.

A still further object is to produce a saw rig which is primarly devised for cutting out hedge, fence rows, small groves and trees of resonable size, wherein the cutting operation may be accomplished in an easier and quicker manner than by like constructions with which I am acquainted.

A still further object is to produce a cutting and trimming device for shrubbery, trees or the like in which no clamps or anchorage is required to hold the rig to its work, and also one which may be easily handled, and drawn toward the material to be operated on, so that the shrubbery, trees, etc., may be trimmed on one side, then passed around and trimmed on the opposite side.

The foregoing, and many other objects which will present themselves as the nature of the invention is better understood, may be accomplished by a construction, combination and operative association of parts such as is disclosed by the drawings which accompany and which form part of this specification.

In the drawings:—

Figure 1 is a side elevation of a saw rig in accordance with this invention, the saw being in vertical cutting position.

Figure 2 is a top plan view thereof.

Figure 3 is a sectional view on the line 3—3 of Figure 1.

Figure 4 is a sectional view on the line 4—4 of Figure 1.

Figure 5 is a side elevation showing the saw in horizontal cutting position.

Figure 6 is a top plan view thereof.

Figure 7 is a fragmentary sectional view approximately on the line 7—7 of Figure 5.

Figure 8 is a sectional view on the line 8—8 of Figure 5.

Figures 9 to 11 illustrate details.

The wheeled body of my improved saw rig includes a frame which comprises parallel side beams 1—1' connected approximately intermediately and at what I will term their rear ends by cross beams 2—2' respectively. The beam 1', is arranged on the right hand side of the body, when looking toward the rear thereof, and has arising from its front end a post 3. The post is dovetailed in the beam 1', and in addition to this is supported thereon by an angle iron 4 which is bolted to the inner face of the post and to the upper face of the beam. The top of the post is cut from its inner and outer faces at opposite angles, the outer angle portion being indicated for distinction by the numeral 5, and secured thereon is a metallic plate 6 that is provided with a staple 7. To the plate 6 is connected one of the eye ends of a brace rod 8, the opposite end of the said rod being connected as at 9 to the cross beam 2. On the outer or front face of the post 3, at a suitable distance from the top thereof there is secured by means 10 a downwardly directed bracket 11. The secured end of the bracket is offset from the body thereof, the said body being in the nature of a flat plate and having its free end rounded or flared outwardly from the post. This end of the body of the bracket is provided with a bolt opening which is in a line with a similar opening in the post, and through these openings there is passed a bolt 12. The bolt also passes through the vertical arm of the angle brace 4, and preferably threadedly engages the opening in the said arm.

Secured by U-bolts 13 that pass through the beams 1 between the transverse beams 2 and 2' is an axle 14, and on the ends of this axle there are journaled the ground wheels 15.

Secured to the inner face of the beam 1', in a line with the inner face of the post 3, and also, if desired, connected to the said post is the straight end 16 of one of the angle sides of a substantially U-shaped metallic bracket 17. The opposite angle arm of the bracket 17 is also provided with a straight extension which is secured by bolts or the like to the inner face at the forward end of the beam 1. The upper member of the bracket 17 is straight and has secured at its corners upwardly directed plates 18 respectively. These plates have flanged ends, the inner flanged end being bolted or otherwise secured to the flat portion of a plate 19, the inner end of the said plate being extended at a right angle and being secured by means 20 to the inner face of the post 3. The opposite end of the plate 19, to which the second vertical plate 18 has its angle end secured, is arranged at an upward and outward angle, as indicated by the numeral 21, and is from thence extended at an outward and downward curvature, as indicated by the numeral 22. The portion 22 provides a track, and will hereinafter be referred to as such. The arched or curved track terminates approximately in a line with the lipped end of the bracket 11, and has either secured thereto or is formed with an inwardly bowed extension 23 that has a flat end which rests against the outer face of the beam 1 and is secured thereto by means 24. The means 24 may be also employed for securing the straight end of the substantially U-shaped bracket 17 to the inner face of the beam 1.

Secured on the inner end of the beam 1, is the offset portion of a bracket 25 of a similar construction to the bracket 11, the said bracket having at its lipped end a bolt opening, and passing through this opening and received in a suitable threaded opening in the beam 1 is a bolt 26. The bolts 12 and 26 close the lipped ends of the bracket with respect to the post 3 and to the beam 1.

The track, at the juncture thereof with the inwardly arched extension 23 has secured thereon a longitudinally extending plate that provides a rest 27, and the said track at the juncture of the angle extension 22 of the plate 23 is provided with a wedge opening in which is received the wedge-shaped shank 28 of a bolt 29. The track 22, above the rest plate 27 is provided with a wedge opening 30 for the reception of the shank of the same or a similar bolt 29.

By reference to the drawings, it will be noted that the upper edge of the rest plate 27 is disposed in a line parallel to the bolt 12 that passes through the bracket 11 and also that the track 22 has its upper end, or rather the portion thereof connected to the angle extension 21 of the plate 19, terminating in a line with the shouldered end of the bracket 25. The importance of this construction will presently be apparent.

A shaft support is broadly indicated by the numeral 32. The member 32 is in the nature of a flat bar or plate and has its ends offset in the same direction. These angle ends, 33, each has secured on its outer face an angle plate 34, the outer member of each of the plates 34 being disposed over the ends of the extensions 33 and have secured thereon boxings 35 in which a shaft 36 is journaled. The bearings in the boxings 35 are babbeted, and the shaft 36, while freely rotatable in its bearings, is held against longitudinal movement through the boxings by collars 37 which are removably secured thereon by binding elements. One of the angle ends 33 of the shaft support 32 has bolted thereon a plate 38, the inner end of which contacting with the end of the angle plate 34, and the opposite end extending a suitable distance beyond the hanger and being formed with a lip 39 to engage the inner face and inner edge of the track 22. The referred to angle end 33 of the support, and the guide plate 38 have aligning wedge-shaped openings therethrough so that the wedge shanks of the bolts 29, heretofore referred to, may pass through these openings and through the openings in the ends of the track, in accordance with the position of the hanger on the device. When the support is in vertical position, and the shaft in a like position, the referred to bolt 29 is passed through the openings in the top of the shank, the support being swung so that its lower end is received in the bracket 25, the bolt 26 being previously removed, but thereafter repositioned so that the support and shaft will be thus retained vertically. Of course, a nut 40 engages the threaded portion of the bolt 29. This nut and the bolt are removed as is also the bolt 26, when the support and shaft are to be moved to horizontal position on the device. When the bolts are removed the guide directs the support downwardly on the curved track 22, until the guide 38 rests on the rest plate 27. The opposite end of the support is received in the bracket 11, and the bolt 12, which has previously been partly withdrawn from the post is again moved to enter the opening in the bracket. The bolt supports this end of the support, and the wedge bolt is again applied to the opposite end of the support, being passed through the opening 30 in the track above the rest plate 27. Thus it will be noted that the support and shaft may be sustained either vertically or horizontally, and also if desired, when one end of the support is manually supported, the said support and shaft may be sustained at desired angles with respect to the device.

Bracing the track and the frame which supports the track is a brace rod 41 which is also secured to the inner transverse beam 2 of the frame. The plate 19 and the straight upper connecting member for the angle arms of the bracket 17 have aligning rounded openings therethrough. These openings provide bearings for a shaft 42 which has its lower end secured to a head 43 provided with a downwardly curved fork 44. At the lower ends of the fork 44 there is an axle 45 on which is journaled a wheel 46, the wheel, of course, being disposed between the arms of the fork. If desired, suitable anti-frictional means may be provided between the head 43 and the upper member of the bracket 17. The shaft 42 has its upper end provided with an opening through which is passed a sustaining element such as a key or cotter pin 47 that holds the shaft and wheel on the forward end of the rig.

Keyed or otherwise secured on the shaft 36 is a belt wheel 48 which is disposed opposite the end of the support 32 provided with the guide 39, and around the wheel 48 there is trained a belt 49 that is also trained around a wheel 50 on the shaft 51 of a motor 52. The wheel 50 is under the control of a clutch 53 operated by a pivotally supported rod 54. By swinging the rod in one direction the wheel will be locked to the motor shaft and by swinging the rod in a second direction the wheel will be unlocked from the shaft.

Freely mounted on the shaft 36, are boxings 55 secured to the inner and spread ends of the side members 56 of the saw supporting frame. The frame is held against movement longitudinally on the shaft 36 by suitable stop collars 57 each of which having a binding element 58. The side members 56 of the saw supporting frame are braced, throughout their length by transverse connecting bars 58', the side members 56 supporting at their outer ends boxings 59 for a shaft 60 on one or both ends of which there is a circular saw or saws 61. The side members 56 of the saw frame have also attached thereto arched guards 62 which are disposed at the inner edges of the saws 61. On the right hand side of the saw frame, when looking toward the device from the front thereof, there is secured a fixed handle 63. Inward of the handle 63 there is also arranged upon the said side member 56 of the saw frame a movable handle. This handle comprises an angle member 64 which has its longer arm, at its lower end provided with a removable clip 65 that surrounds the member 56 of the frame and its opposite end has bolted or otherwise secured thereto the handle proper which is indicated by the numeral 66. On the outer face of the post 3 there is a substantially U-shaped handle 65'.

On the saw shaft there is keyed a belt wheel 66'. On the shaft 36, between the inner and spread arms of the saw frame there is keyed a belt wheel 67. Around these belt wheels 66 and 67 there is trained a belt 68. It will be obvious that when the shaft 36 is revolved the saw shaft will be likewise revolved.

Secured to the staple 7 there is one end of a helical spring 69. On the opposite end of the spring there is secured a threaded rod 70. On the rod 70 there is threaded a turn buckle 71. The turn buckle also engages with a rod or link 72 that has its threads at a different pitch from those on the rod 70. The rod 72 has a hooked outer end to engage the outer cross brace 58 of the saw frame, or to be connected to any other desired part of the frame which will not interfere with the free turning of the belt 68. The resilient supporting means for the saw frame, just described, are only employed when the saw is in vertical cutting position, as disclosed in Figures 1 and 2 of the drawings, and when so arranged the operator grasps the handle 65' on the post 3 and wheels the machine to a proper position with respect to the work, arranging the saw or saws 61 opposite the work. The operator then pulls on the clutch rod to cause the driving belt 52 to revolve with the wheel 50 of the motor. The operator then grasps either or both of the handles 63—66 so that the saw frame and saws may be swung on the axle 36. When the device is moved to arrange the saw horizontally, the belt 52 is given a one-quarter twist, and the handles 63 and 66 are again employed to bring the saw to its work.

A double saw or two saws 61 are only employed when the device is used for cutting stove wood. With the improvement trees or shrubbery can be cut horizontally within four inches from the ground. With the device, the employment of clamps or anchorage of any kind to hold the rig to tree or shrubbery while in operation is not required. When in horizontal position, the saw can be swung in either direction with respect to the supporting rig, and as previously stated, may, should it be found desirable, also be made to cut at an angle between the horizontal and perpendicular and as a result prevent any binding on the stump of a tree being cut during the cutting operation, as a V-shaped cut may be made on one side of a tree and thereafter the device may be shifted so that a cut may be made on the opposite side of the tree so that the tree will fall away from the device.

Having described the invention, I claim:

1. In a saw rig, a body comprising a frame, a post at the forward end on one of the sides of the frame, an arched track disposed opposite the post and supported from the post and from the frame, a bracket on the front of the post, a bracket on the front side of the frame opposite the post, a support having one end guided on the track and movable thereon to horizontal or to vertical position and having its second end received in one of the brackets when in its mentioned position, means locking said ends in said brackets, means locking the opposite ends of the support when in either of its mentioned positions, a shaft journaled in bearings on the support, means for imparting motion thereto, and a circular saw arranged forward of the support and receiving motion from the shaft.

2. In a saw rig, a body comprising a frame, ground wheels journaled at the rear of the frame, a post arising from one of the sides of the frame at the forward end thereof, brace means between the post and frame, a handle on the post, a bracket on the outer face of the post, a substantially U-shaped bracket secured to the side members of the frame, plates arising therefrom, a horizontal plate secured to the post and to the said last mentioned plates and having its outer end extended at an upward angle and from thence rounded to provide a track and from thence extended toward and secured to the side of the frame, a rest plate on the lower end of the rounded portion of the track disposed opposite the bracket on the post, a bracket on the end of the frame disposed below the track, a guide wheel journaled in a fork provided with a shaft which finds a bearing in the U-shaped bracket and the upper plate that is secured thereabove, a support having angle ends, a guide on one of said ends engaging the track, a bolt having a wedge shank designed to pass through the said end of the support and through the track for sustaining the support either vertically or horizontally on the track, a nut for the bolt, and said support designed to have its opposite end received in either of the brackets in accordance to its vertical or horizontal position, means on the brackets for locking the support therein, bearing boxings on the angle ends of the support, a shaft journaled in said bearings, means holding the shaft against longitudinal movement, a saw frame freely mounted on the shaft, a saw journaled on the outer end of the frame, means for imparting motion to the shaft, and for delivering said motion to the saw.

3. In a saw rig, a body comprising a frame, ground wheels journaled at the rear of the frame, a post arising from one of the sides of the frame at the forward end thereof, brace means between the post and frame, a handle on the post, a bracket on the outer face of the post, a substantially U-shaped bracket secured to the side members of the frame, plates arising therefrom, a horizontal plate secured to the post and to the said last mentioned plates and having its outer end extended at an upward angle and from thence rounded to provide a track and from thence extended toward and secured to the side of the frame, a rest plate on the lower end of the rounded portion of the track disposed opposite the bracket on the post, a bracket on the end of the frame disposed below the track, a guide wheel journaled in a fork provided with a shaft which finds a bearing in the U-shaped bracket and the upper plate that is secured thereabove, a support having angle ends, a guide on one of said ends engaging the track, a bolt having a wedge shank designed to pass through the said end of the support and through the track for sustaining the support either vertically or horizontally on the track, a nut for the bolt, and said support designed to have its opposite end received in either of the brackets in accordance to its vertical or horizontal position, means on the brackets for locking the support therein, bearing boxes on the angle ends of the support, a shaft journaled in said bearings, means holding the shaft against longitudinal movement, a saw frame freely mounted on the shaft, a saw journaled on the outer end of the frame, means for imparting motion to the shaft, and for delivering said motion to the saw, a fixed handle on the saw frame, and an adjustable and removable handle on said saw frame.

In testimony whereof I affix my signature.

EMMETT C. AVERY.